(12) United States Patent
Horiko (10) Patent No.: US 8,708,503 B2
(45) Date of Patent: Apr. 29, 2014

(54) PROJECTOR HAVING FOOT UNIT WITH INCREASED PROJECTION LENGTH AND DECREASED SIZE

(75) Inventor: Yukihiro Horiko, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 13/352,621

(22) Filed: Jan. 18, 2012

(65) Prior Publication Data

US 2012/0194789 A1    Aug. 2, 2012

(30) Foreign Application Priority Data

Jan. 27, 2011    (JP) .................................. 2011-014859

(51) Int. Cl.
*G03B 21/14*    (2006.01)
(52) U.S. Cl.
USPC .............. 353/119; 353/30; 353/79; 353/122; 348/744; 248/188.1; 248/188.2
(58) Field of Classification Search
USPC ................. 353/30, 79, 119, 122; 349/5, 7–9; 348/744–747; D16/221, 225, 229, 232, D16/235, 203, 208, 514; 248/188.1, 188.2, 248/188.3, 160–161, 652, 664, 665, 669
See application file for complete search history.

(56) References Cited

U.S. PATENT DOCUMENTS

| | | | |
|---|---|---|---|
| 6,302,543 B1 | 10/2001 | Arai et al. | |
| 6,334,687 B1 * | 1/2002 | Chino et al. | 353/79 |
| 6,461,002 B1 | 10/2002 | Su | |
| 6,793,348 B2 * | 9/2004 | Lee et al. | 353/119 |
| 7,475,996 B2 | 1/2009 | Hsu et al. | |
| D658,224 S * | 4/2012 | Kawabe et al. | D16/235 |
| 2006/0244932 A1 | 11/2006 | Hsu et al. | |
| 2011/0235002 A1 * | 9/2011 | Hsieh et al. | 353/101 |

FOREIGN PATENT DOCUMENTS

| | | |
|---|---|---|
| JP | 2004-52943 A | 2/2004 |
| JP | 2009-116146 A | 5/2009 |
| TW | I275898 | 3/2007 |
| WO | WO-98-12601 | 3/1998 |

* cited by examiner

*Primary Examiner* — Sultan Chowdhury
(74) *Attorney, Agent, or Firm* — ALG Intellectual Property, LLC (57) ABSTRACT

A projector includes: an external case which stores an optical unit; and a foot unit which projects from the external case, the foot unit includes: a first foot main body whose projection length from the external case is variable, a second foot main body whose projection length from the first foot main body in the same direction as the projection direction of the first foot main body is variable, a first adjusting unit configured to adjust the projection length of the first foot main body, and a second adjusting unit configured to adjust the projection length of the second foot main body.

7 Claims, 6 Drawing Sheets

PROJECTOR HAVING FOOT UNIT WITH INCREASED PROJECTION LENGTH AND DECREASED SIZE

The entire disclosure of Japanese Patent Application No. 2011-14859, filed Jan. 27, 2011 is expressly incorporated by reference herein.

BACKGROUND

1. Technical Field

The present invention relates to a projector.

2. Related Art

There is a projector known in the art which modulates light emitted from a light source according to image information, and projects the modulated light onto a screen or the like. This type of projector has a variety of applications such as image projection for presentation held in a corporation or for home theater, and therefore has been decreasing in size and weight so as to be easily carried to a desired place. Moreover, such a projector capable of changing the height of an image to be projected by using a adjusting mechanism has been proposed (for example, see JP-A-2004-52943).

A adjusting mechanism (adjuster) disclosed in JP-A-2004-52943 includes an external case which has a piston storage chamber, a foot unit inserted into the piston storage chamber in such a manner as to freely slide thereinto, and others. The foot unit is so constructed as to freely move with respect to the external case. The projector shown in JP-A-2004-52943 adjusts the position of an image to be projected by changing the inclination angle of the projector in accordance with the shift position of the foot unit.

According to the technology proposed in JP-A-2004-52943, however, size reduction of the structure which accommodates the foot unit within the piston storage chamber is difficult. On the other hand, when the foot unit is shortened for size reduction, position adjusting of the position of the image to be projected in a wide range becomes difficult.

SUMMARY

An advantage of some aspects of the invention is to solve at least a part of the aforementioned problems, and the invention can be implemented as the following forms or application examples.

An aspect of the invention is directed to a projector including: an optical unit configured to modulate light emitted from a light source and project the modulated light; an external case which stores the optical unit; and a foot unit configured to project from the external case, the foot unit includes a first foot main body whose projection length from the external case is variable, a second foot main body whose projection length from the first foot main body in the same direction as the projection direction of the first foot main body is variable, a first adjusting unit configured to adjust the projection length of the first foot main body, and a second adjusting unit configured to adjust the projection length of the second foot main body.

According to this aspect of the invention, the foot unit includes the first and second foot main bodies. The first adjusting unit adjusts the projection length of the first foot main body from the external case, while the second adjusting unit adjusts the projection length of the second foot main body from the first foot main body. In this case, the projection length of the foot unit from the external case increases while the space of the external case for storing the foot unit in the projection direction decreases. Therefore, the projector achieves both size reduction and large-scale change of its inclination angle with respect to the installation surface, that is, the height of an image to be projected in a wide range.

In the projector of the above aspect of the invention, it is preferable that the second foot main body of the projector of the above aspect is constructed so as to be inserted into the first foot main body.

According to this aspect of the invention, the second foot main body is inserted into the first foot main body. This structure achieves space saving of the external case in directions crossing the projection direction of the foot unit, and thus contributes to further size reduction of the projector.

In the projector of the above aspect of the invention, it is preferable that the first foot main body of the projector of the above aspects rotates to change the projection length of the first foot main body. In this case, the foot unit further includes a holding unit configured to rotatably support the first foot main body, and hold the second adjusting unit. In addition, it is preferable that the holding unit shifts with the first foot main body along the projection direction of the first foot main body.

According to this aspect of the invention, the first foot main body rotates to change its projection length. Moreover, the holding unit which holds the second adjusting unit supports the first foot main body such that the first foot main body can rotate, and shifts with the first foot main body in the projection direction of the first foot main body. When the projection length of the first foot main body is changed by rotation of the first foot main body, that is, when the first foot main body shifts in its projection direction, the holding unit moves together with the first foot main body in the projection direction without rotation. In this case, the second adjusting unit held by the holding unit does not rotate. Thus, the structure of the second adjusting unit can be simplified. Moreover, the user of the projector can easily observe an operation portion provided on the second adjusting unit for handling, for example, and adjust the projection length of the second foot main body.

In the projector of the above aspect of the invention, it is preferable that at least either the first foot main body or the second foot main body of the projector of the above aspects includes a spiral portion which has an outer periphery formed with a spiral concave. In this case, at least either the first adjusting unit or the second adjusting unit has an engaging portion whose condition switches between an engagement condition where the engaging portion engages with the spiral portion and a non-engagement condition where the engaging portion disengages from the spiral portion.

According to this aspect of the invention, at least either the first foot main body or the second foot main body has the spiral portion which has an outer periphery formed with a spiral concave, and at least either the first adjusting unit or the second adjusting unit has the engaging portion whose condition switches between the engagement condition where the engaging portion engages with the spiral portion and the non-engagement condition where the engaging portion disengages from the spiral portion. In this case, the user can perform fine adjusting of the projection length of the foot unit by rotating either the first foot main body or the second foot main body under the engagement condition, and also can change the projection length of the foot unit by a large amount at a time under the non-engagement condition. Thus, the image to be projected can be easily shifted to a desired position, wherefore the usability of the projector improves.

In the projector of the above aspect of the invention, it is preferable that the foot unit of the projector of the above aspects has a base fixed to the external case. In this case, the second adjusting unit is concealed in the base when the projection of the foot unit is the minimum. According to this aspect of the invention, the second adjusting unit is concealed in the base. In this case, the volume of uneven portions and the like exposed in the external appearance decreases. Accordingly, the design of the projector improves.

BRIEF DESCRIPTION OF THE DRAWINGS

The invention will be described with reference to the accompanying drawings, wherein like numbers reference like elements.

DESCRIPTION OF EXEMPLARY EMBODIMENT

A projector according to an exemplary embodiment of the invention is hereinafter described with reference to the drawings. The projector in this embodiment modulates light emitted from a light source according to image information, and projects the modulated light with expansion onto a screen or the like.

Main Structure of Projector

Figure 1A:
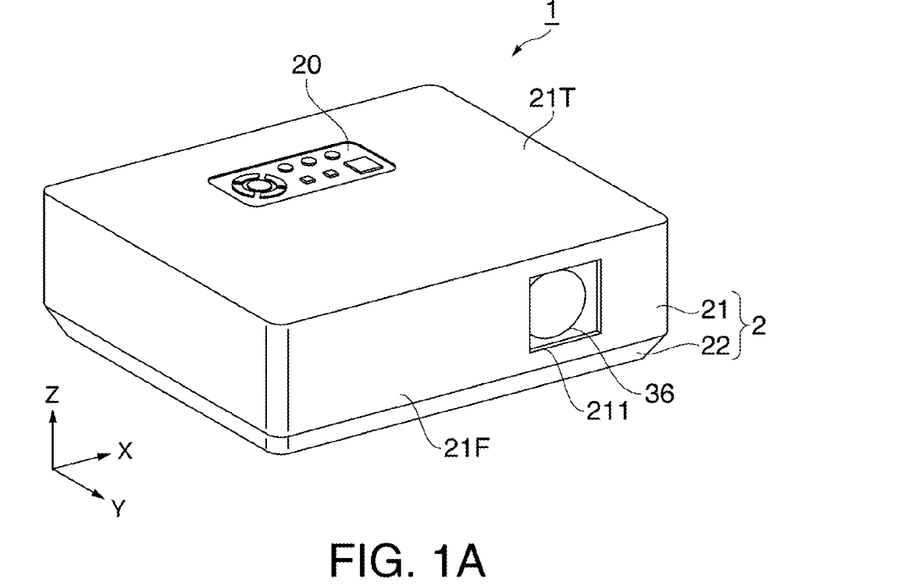
FIGS. 1A and 1B are perspective views schematically illustrating the external appearance of a projector according to an embodiment.
Figure 1B:
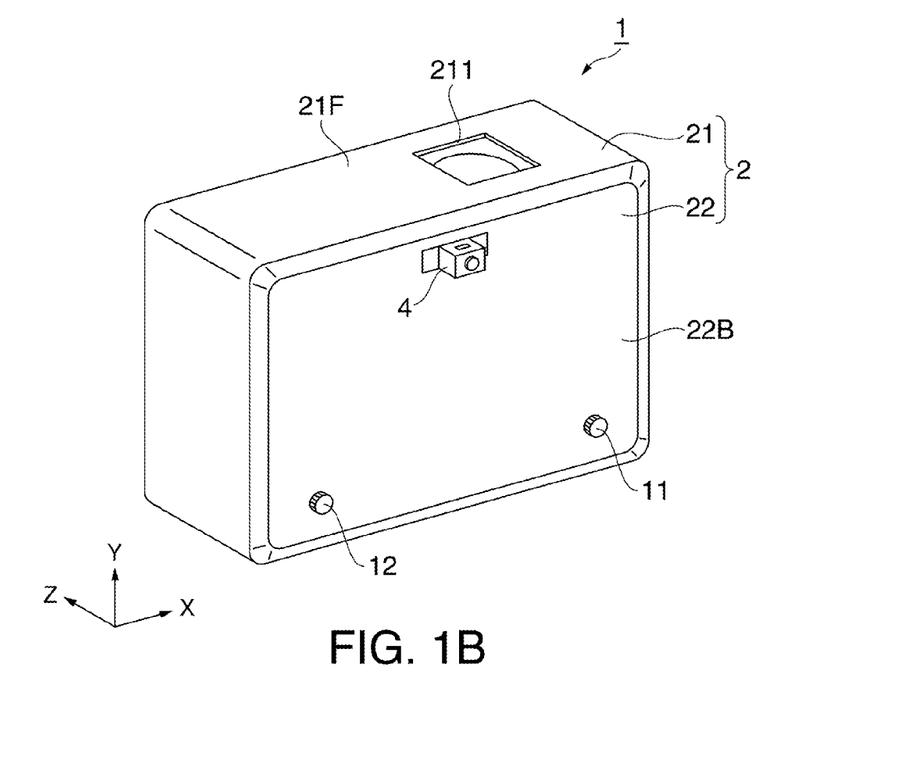
Figure 2:
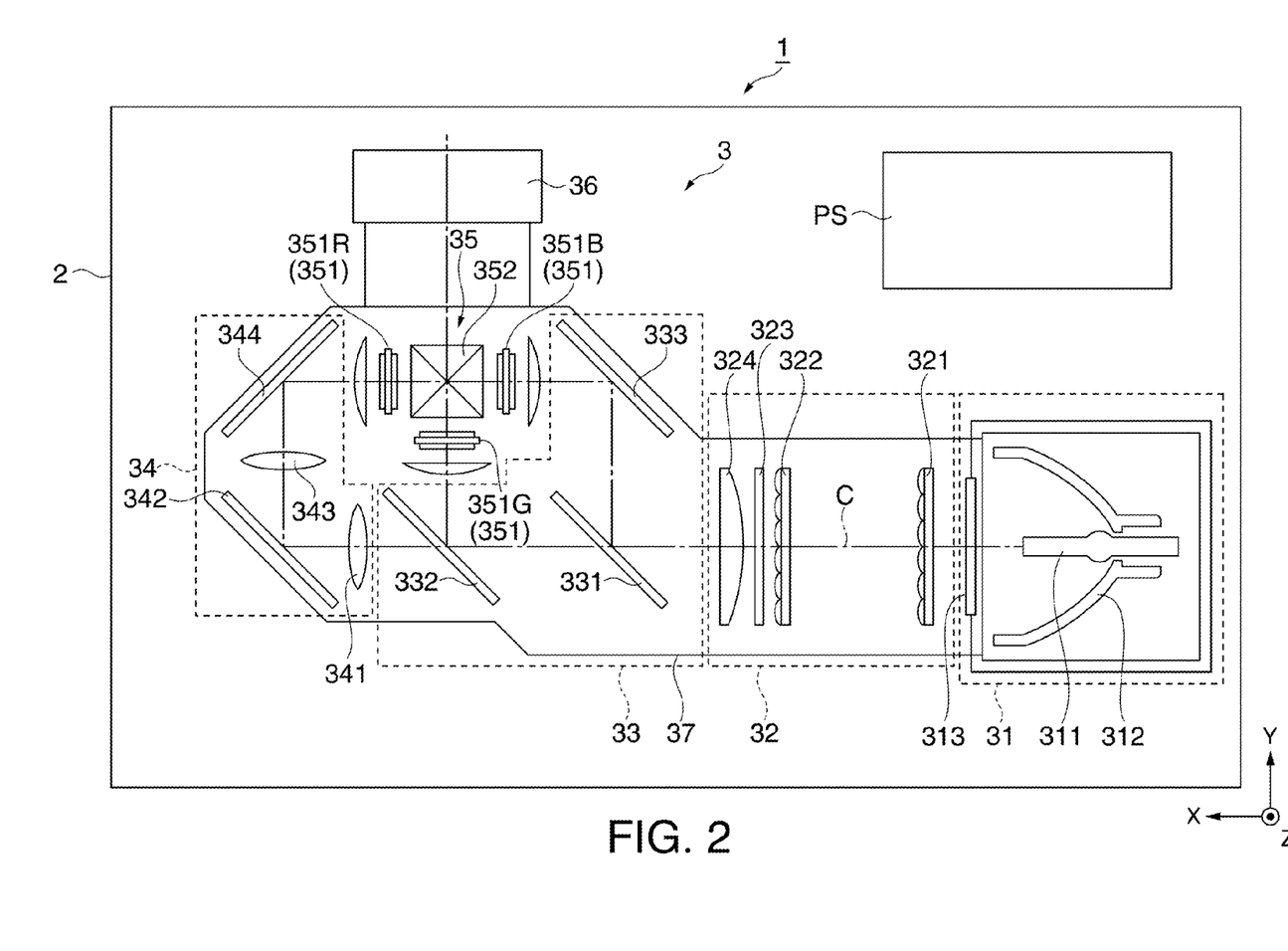
FIG. 2 schematically illustrates the general structure of the projector according to the embodiment.

FIGS. 1A and 1B are perspective views schematically illustrating the external appearance of a projector 1 according to this embodiment. FIG. 1A shows the projector 1 placed on a desk top or other places as viewed from above. FIG. 1B shows the projector 1 as viewed from below. FIG. 2 schematically illustrates the general structure of the projector 1 in this embodiment.

As illustrated in FIGS. 1A and 1B and 2, the projector 1 includes an external case 2 constituting the external case, a control unit (not shown), an optical unit 3 having a light source device 31, a power source device PS supplying power to the light source device 31 and the control unit, a foot unit 4, a fixing foot 11, a horizontal adjusting foot 12, and others. A cooling fan for cooling the interior of the projector 1 and other components are further provided within the external case 2, which are not specifically shown in the figures.

As illustrated in FIGS. 1A and 1B, the external case 2 made of synthetic resin has an upper case 21 forming the upper part, a lower case 22 forming the lower part, and others, all of which are fixed by screws or the like.

As can be seen from FIGS. 1A and 1B, an opening 211 is provided on a front surface 21F of the upper case 21 as an opening through which projected light passes.

As illustrated in FIG. 1A, an operation panel 20 operated when various commands are inputted to the projector 1 is provided on a top surface 21T of the upper case 21. The external case 2 further includes an inlet port through which the outside air is introduced into the projector 1, an outlet port through which the air heated within the external case 2 is discharged to the outside, and others, which are not shown in the figures.

The control unit includes a CPU (central processing unit), a ROM (read only memory), a RAM (random access memory) and others to function as a computer. The control unit performs controls over the operations of the projector 1, such as control associated with projection of images.

The optical unit 3 executes optical processing for light emitted from a light source 311 under the control of the control unit, and projects the processed light.

As illustrated in FIG. 2, the optical unit 3 includes the light source device 31 having the light source 311, an integrator illumination system 32, a color separation system 33, a relay system 34, an electro-optical device 35, a projection lens 36, and an optical component housing 37 which disposes the respective components 31 through 36 at predetermined positions on the optical path.

As can be seen from FIG. 2, the optical unit 3 has a substantially L shape in the plan view. The light source device 31 is detachably attached to one end of the optical unit 3, while the projection lens 36 is provided at the other end of the optical unit 3. In the description of this embodiment herein, the respective directions are defined as follows for convenience of explanation. The +X direction corresponds to the direction in which light is emitted from the light source device 31, the +Y direction corresponds to the direction in which light is projected from the projection lens 36 (front direction), and the +Z direction corresponds to the direction perpendicular to the X direction and the Y direction and extends upward as viewed in FIG. 1A (upward direction).

The light source device 31 includes the light source 311 constituted by a discharge type light source such as an extra-high pressure mercury lamp and a metal halide lamp, a reflector 312, a collimating lens 313 functioning as a light transmitting member, and others. According to this structure of the light source device 31, light emitted from the light source 311 is reflected by the reflector 312, transmitted through the collimating lens 313 for equalization of the emission direction, and released toward the integrator illumination system 32.

The integrator illumination system 32 includes a first lens array 321, a second lens array 322, a polarization converting element 323, and a stacking lens 324.

The first lens array 321 functioning as an optical element for dividing light emitted from the light source device 31 into plural partial lights has a plurality of small lenses disposed in matrix in a plane substantially perpendicular to an optical axis C of the light emitted from the light source device 31.

The second lens array 322 having a structure substantially similar to the structure of the first lens array 321 stacks the partial lights received from the first lens array 321 on the surfaces of liquid crystal light valves 351 (described later) in cooperation with the stacking lens 324.

The polarization converting element 323 has a function of converting random polarized lights received from the second lens array 322 into substantially one type of polarized lights processable by the liquid crystal light valves 351.

The color separation system 33 provided with two dichroic mirrors 331 and 332 and a reflection mirror 333 has a function of separating the lights received from the integrator illumination system 32 into three color lights of red light (hereinafter referred to as "R light"), green light (hereinafter referred to as "G light"), and blue light (hereinafter referred to as "B light").

The relay system 34 which includes an entrance side lens 341, a relay lens 343, and reflection mirrors 342 and 344 has a function of guiding the R light separated by the color separation system 33 toward a liquid crystal light valve 351R for R light. The light guided by the relay system 34 of the optical unit 3 may be the B light, for example, instead of the R light.

The electro-optical device 35 includes the liquid crystal light valves 351 functioning as light modulation devices, and a cross dichroic prism 352 functioning as a color combining device. The electro-optical device 35 modulates the respective color lights separated by the color separation system 33 according to image information, and combines the modulated color lights.

Each of the liquid crystal light valves 351 provided for the corresponding light of the three color lights with one-to-one correspondence (liquid crystal light valve 351R for R light, liquid crystal light valve 351G for G light, and liquid crystal light valve 351B for B light) has a transmission type liquid crystal panel, and an entrance side polarization plate and an exit side polarization plate disposed on one and the other surfaces of the liquid crystal panel, respectively.

Each of the liquid crystal light valves 351 has a rectangular pixel area on which not-shown small pixels are disposed in matrix, and forms a display image within the pixel area containing the pixels whose light transmissivities are set in accordance with display image signals. The respective color lights separated by the color separation system 33 are modulated by the liquid crystal light valves 351, and supplied to the cross dichroic prism 352.

The cross dichroic prism 352 has a substantially square shape in the plan view formed by four rectangular prisms affixed to each other. The cross dichroic prism 352 further has two dielectric multilayer films disposed on the interfaces of the affixed rectangular prisms. The cross dichroic prism 352 combines the respective color lights by using the dielectric multilayer films capable of reflecting the color lights modulated by the liquid crystal light valves 351R and 351B and transmitting the color light modulated by the liquid crystal light valve 351G.

The projection lens 36 constituted by a combination of lenses enlarges the light modulated by the liquid crystal light valves 351 and combined by the cross dichroic prism 352, and projects the enlarged light on the screen.

The power source device PS has a power source block and a light source drive block for driving the light source device 31 to supply power to electronic components such as the control unit and the light source 311. The details of the power source device PS are not explained herein.

As illustrated in FIG. 1B, the foot unit 4, the fixing foot 11, and the horizontal adjusting foot 12 project from a bottom surface 22B of the lower case 22 to contact an installation surface where the projector 1 is placed for support of the projector 1.

As can be seen from FIG. 1B, the foot unit 4 is disposed substantially at the center of the front part (+Y side) of the bottom surface 22B of the lower case 22, and designed such that the length of the foot unit 4 projecting from the bottom surface 22B is variable. The inclination of the projector 1 placed on the installation surface is varied in accordance with the change of the projection length of the foot unit 4, whereby the position of the image to be projected in the up-down direction can be changed. The details of the structure of the foot unit 4 will be described later.

The fixing foot 11 and the horizontal adjusting foot 12 are provided at one and the other corners, respectively, of the rear part (−Y side) of the bottom surface 22B. The fixing foot 11 projects from the bottom surface 22B by a predetermined length.

The projection length of the horizontal adjusting foot 12 from the bottom surface 22B is variable within a range narrower than that of the foot unit 4. The inclination of the projector 1 placed on the installation surface is varied in accordance with the change of the projection length of the horizontal adjusting foot 12, whereby the inclination of the image to be projected in the X direction can be changed.

Structure of Foot Unit

The details of the foot unit 4 are now explained.

Figure 3:
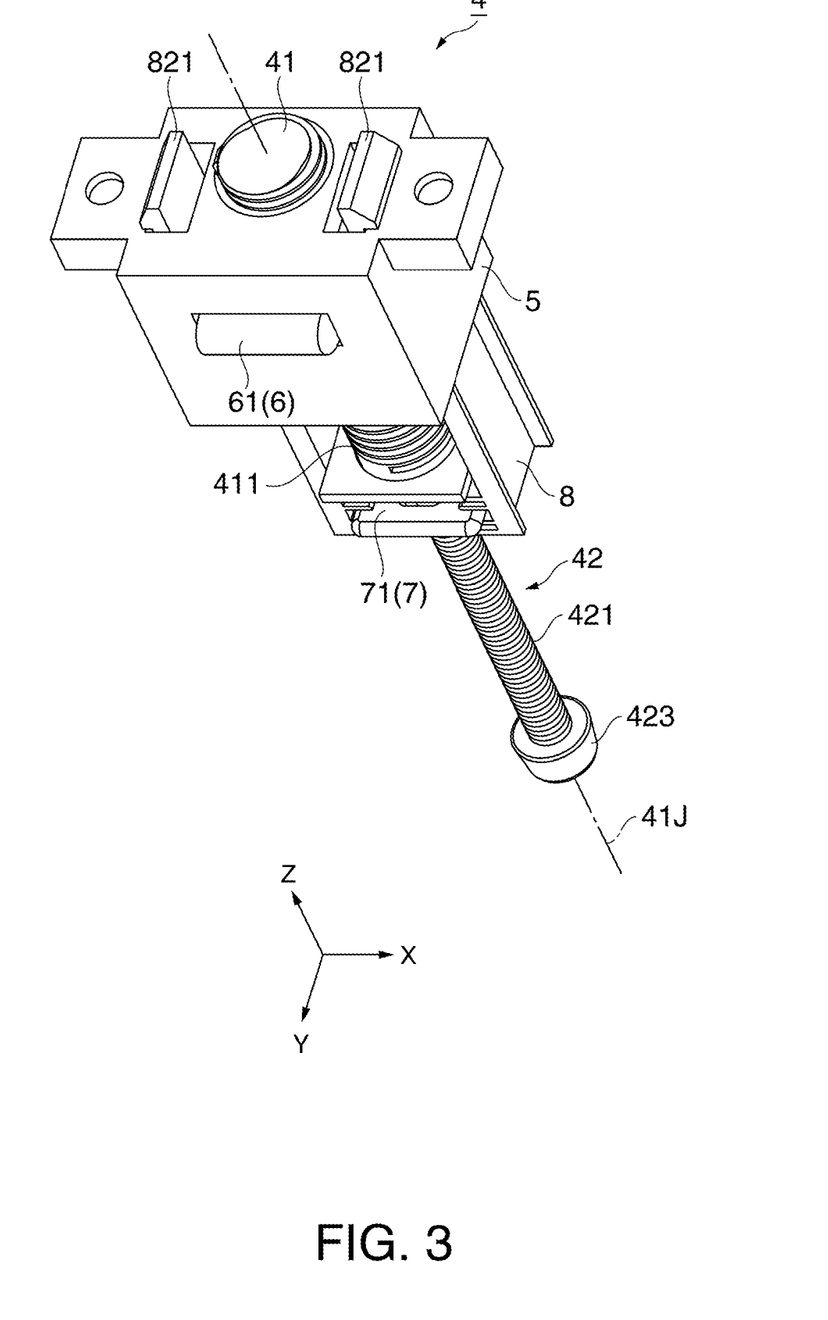
FIG. 3 is a perspective view of a foot unit according to the embodiment.
Figure 4:
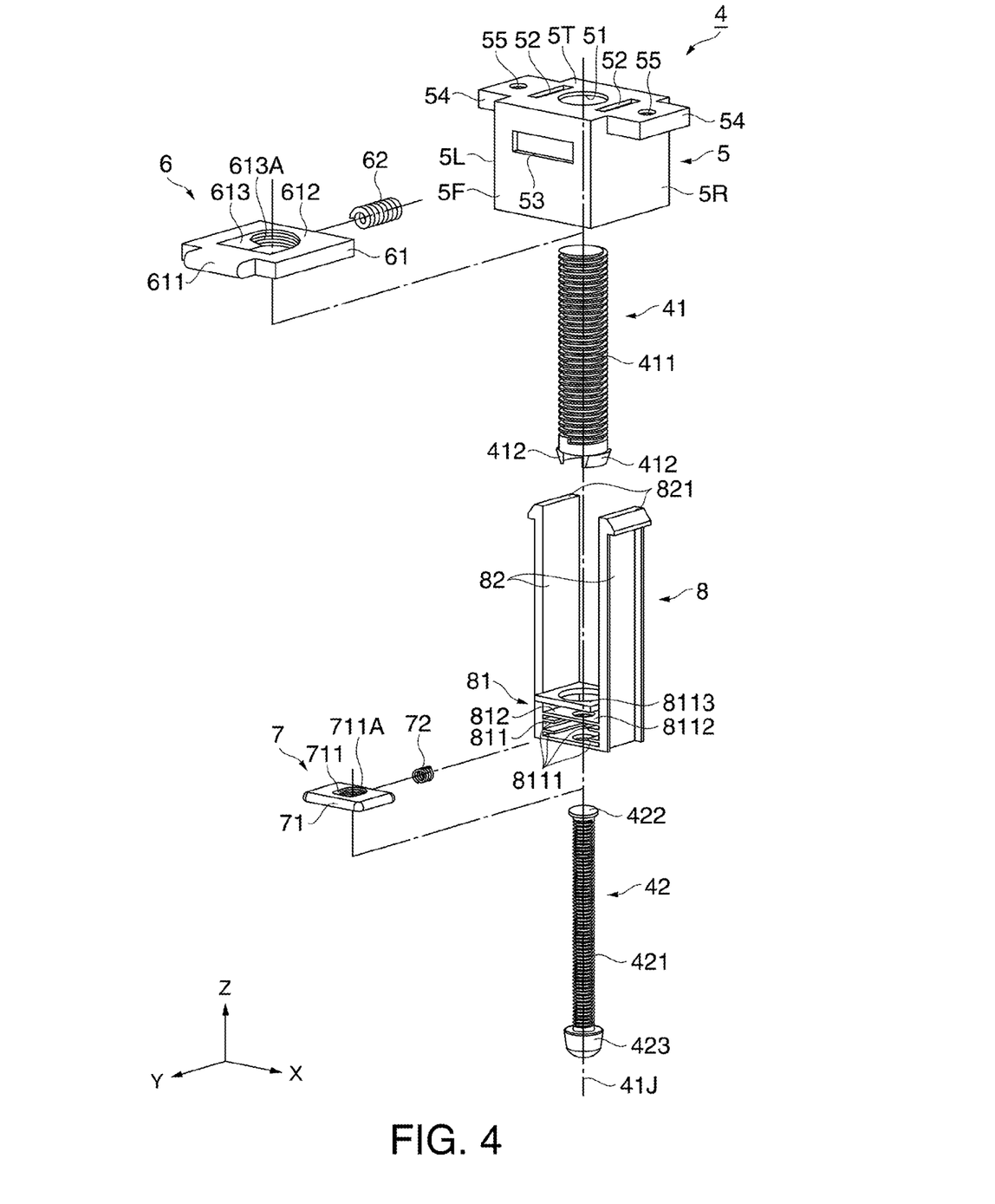
FIG. 4 is a perspective view of the foot unit in the disassembled condition according to the embodiment.

FIG. 3 is a perspective view of the foot unit 4. FIG. 4 is a perspective view of the foot unit 4 in the disassembled condition.

As illustrated in FIGS. 3 and 4, the foot unit 4 includes a first foot main body 41, a second foot main body 42, a base 5, a first adjusting unit 6, a second adjusting unit 7, and a holding unit 8.

The foot unit 4 is constructed such that the projection length of the first foot main body 41 from the bottom surface 22B of the lower case 22 (see FIG. 1B) is variable, and that the projection length of the second foot main body 42 from the first foot main body 41 is variable. The respective projection lengths of the first foot main body 41 and the second foot main body 42 are adjusted by the first adjusting unit 6 and the second adjusting unit 7.

Figure 5A:
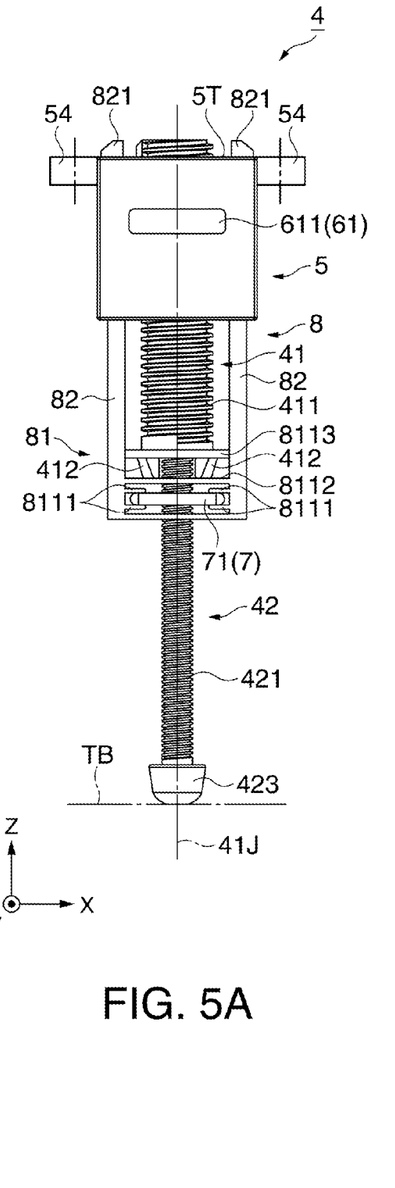
FIGS. 5A and 5B illustrate the foot unit having a first foot main body and a second foot main body both projected to the maximum according to the embodiment.
Figure 5B:
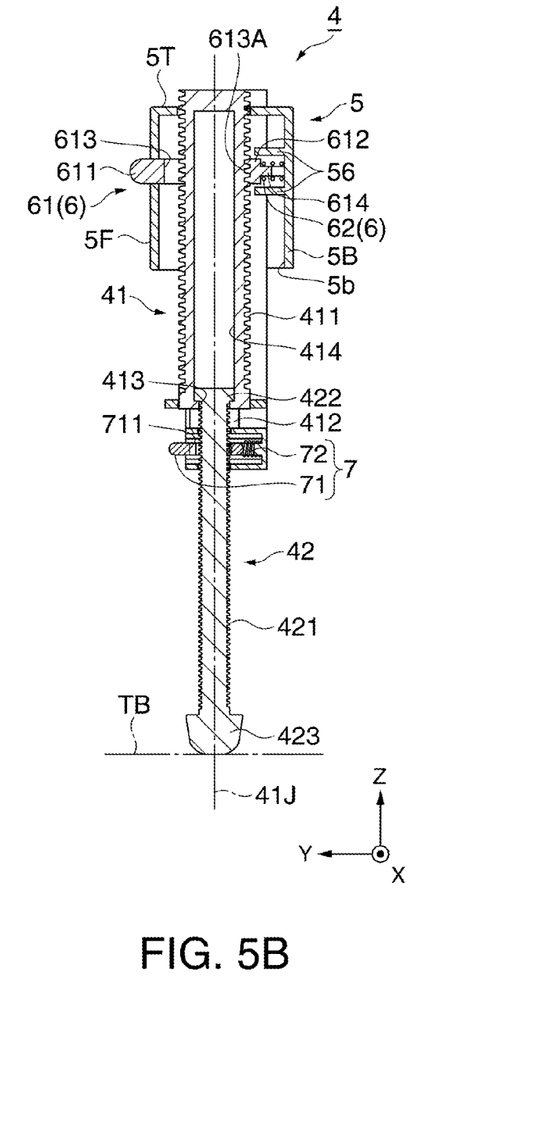

FIGS. 5A and 5B illustrate the foot unit 4 with the first foot main body 41 and the second foot main body 42 projected to the maximum (maximum condition). FIG. 5A is a front view of the foot unit 4 as viewed from the front, while FIG. 5B is a cross-sectional view of the foot unit 4 as viewed in the +X direction.

As illustrated in FIGS. 3 through 5B, the first foot main body 41 has a cylindrical shape having a center axis 41J, and includes a spiral portion 411 having a spiral concave on the outer periphery thereof, and a pair of engaging portions 412 provided below the spiral portion 411.

The spiral portion 411 in this embodiment has a screw groove as the spiral concave with which a first lever 61 (described later) of the first adjusting unit 6 engages. The spiral concave may have a shape other than the screw groove shape.

The pair of engaging portions 412 are shaped symmetric with respect to the center axis 41J, and disposed away from each other. The outside diameter of the root end of the pair of the engaging portions 412 is larger than the outside diameter of the spiral portion 411, while the outside diameter of the projection end (opposite end) of the engaging portions 412 is smaller than the outside diameter of the root end. The pair of the engaging portions 412 are deformed when a force in a direction in which the engaging portions 412 come close to each other is applied to the engaging portions 412.

As illustrated in FIG. 5B, the first foot main body 41 has an opening 413 having a circular shape in the plan view at a position of the lower end surface of the first foot main body 41. A hollow portion 414 having an inside diameter larger than the inside diameter of the opening 413 is formed above the opening 413.

As illustrated in FIGS. 3 through 5B, the second foot main body 42 has a cylindrical shape whose center is disposed on the center axis 41J, and includes a spiral portion 421 having a spiral concave on the outer periphery thereof, an engaging portion 422, and an installation portion 423. The spiral portion 421 and the engaging portion 422 of the second foot main body 42 are so shaped as to be inserted into the first foot main body 41. Moreover, the projection length of the second foot main body 42 from the first foot main body 41 is variable in the same direction as the projection direction of the first foot main body 41.

According to this embodiment, the spiral portion 421 has a screw groove as the spiral concave with which a second lever 71 (described later) of the second adjusting unit 7 engages. The spiral concave may have a shape other than the screw groove shape.

The engaging portion 422 provided above the spiral portion 421 has an outside diameter larger than the outside diameter of the spiral portion 421. Moreover, the outside diameter of the engaging portion 422 is larger than the inside diameter of the opening 413 and smaller than the inside diameter of the hollow portion 414. Thus, as illustrated in FIG. 5B, the engaging portion 422 engages with the step formed by the opening 413 and the hollow portion 414 of the first foot main body 41 so as not to be separated from the first foot main body 41 when the second foot main body 42 is projected to the maximum from the first foot main body 41.

The installation portion 423 disposed below the spiral portion 421 contacts an installation surface TB such as a desk top when the projector is placed on the installation surface TB. The installation portion 423 has a cylindrical shape whose external shape is larger than that of the spiral portion 411, and has a contact tip having a curved surface to contact the installation surface TB.

As illustrated in FIGS. 3 through 5B, the base 5 has a substantially rectangular parallelepiped box-like external shape.

The base 5, the details of which are not explained herein, is constituted by two parts combined into one body, and has an opening on the lower surface side thereof.

As illustrated in FIG. 4, a round hole 51 through which the first foot main body 41 is inserted is formed at the center of a top surface 5T of the base 5. Rectangular guide holes 52 through which a pair of extension portions 82 (described later) of the holding unit 8 are inserted are further formed on the +X side and the −X side of the round hole 51.

A rectangular hole (lever hole 53) extended in the X direction is formed in a front surface 5F of the base 5.

As illustrated in FIG. 5B, the base 5 further has projections (guide projections 56) projecting in the +Y direction from an inner surface 5b of the rear side of the base 5. The guide projections 56 are so shaped as to guide the upper side and the lower side of the rear end of the first lever 61.

As illustrated in FIG. 4, a projection 54 projecting from each of a +X side surface 5R and a −X side surface 5L of the base 5 has a round hole 55 whose center is located on an axis extending in the same direction as that of the enter axis 41J.

The base 5 is fixed to the lower case 22 by screws inserted through the round holes 55. The base 5 may be formed integrally with the lower case 22.

As illustrated in FIG. 4, the first adjusting unit 6 has the first lever 61 and a coil spring 62 to control the projection length of the first foot main body 41.

As illustrated in FIG. 4, the first lever 61 has a plate shape extending along the X-Y plane, and has an operation portion 611 forming the front part of the first lever 61, and a lever main body 612 disposed on the rear side (−Y side) of the operation portion 611 and extended in the +X direction and the −X direction from the operation portion 611. An insertion hole 613 through which the first foot main body 41 is inserted is formed at the center of the lever main body 612. A first engaging portion 613A capable of engaging with the spiral portion 411 of the first foot main body 41 is formed on the −Y side inner surface of the insertion hole 613.

As illustrated in FIG. 5B, the lever main body 612 has a projection 614 projecting from the rear side (−Y side) end surface of the lever main body 612 and inserted into the center of the coil spring 62.

The first lever 61 is accommodated in the base 5 with the operation portion 611 exposed through the lever hole 53 of the base 5.

As illustrated in FIG. 5B, the coil spring 62 is positioned by the projection 614 of the first lever 61 to be disposed between the inner surface 5b of the base 5 and the rear end surface of the lever main body 612 and to urge the first lever 61 toward the front (+Y direction).

The first lever 61 urged by the coil spring 62 comes into a condition in which the first engaging portion 613A engages with the spiral portion 411 of the first foot main body 41. The projection length of the first foot main body 41 is maintained in this engaging condition.

As illustrated in FIG. 4, the second adjusting unit 7 has the second lever 71 and a coil spring 72 to adjust the projection length of the second foot main body 42.

The second lever 71 has a rectangular plate shape in the plan view which extends along the X-Y plane, and includes an insertion hole 711 through which the spiral portion 421 and the engaging portion 422 of the second foot main body 42 are inserted. A second engaging portion 711A capable of engaging with the spiral portion 421 is formed on the −Y side inner surface of the insertion hole 711. The second lever 71 is accommodated in a lever storage portion 811 (described later) of the holding unit 8.

As illustrated in FIG. 5B, the coil spring 72 disposed on the holding unit 8 urges the second lever 71 toward the front (+Y direction).

The second lever 71 urged by the coil spring 72 comes into a condition in which the second engaging portion 711A engages with the spiral portion 421 of the second foot main body 42. The projection length of the second foot main body 42 is maintained in this engaging condition.

The holding unit 8 holds the second adjusting unit 7, and rotatably supports the first foot main body 41.

As illustrated in FIG. 4, the holding unit 8 includes a storage portion 81 having a rectangular parallelepiped shape, and a pair of the extension portions 82 one and the other of which extends upward from the +X side and the −X side ends of the storage portion 81, respectively.

The storage portion 81 has an opening on its front side, and includes the lever storage portion 811 constituted by a plurality of plate-shaped walls extending along the X-Y plane, and an engaging portion storage portion 812.

The lever storage portion 811 corresponds to an area in which the second lever 71 is accommodated. As illustrated in FIG. 4, the lever storage portion 811 has walls 8111 for guiding the upper and lower surfaces of the ±X sides of the second lever 71 so that the second lever 71 can shift in the front-rear direction along the walls 8111.

The engaging portion storage portion 812 is disposed between walls 8112 and 8113 sequentially provided above the walls 8111. As illustrated in FIG. 5A, the engaging portions 412 of the first foot main body 41 are accommodated in the engaging portion storage portion 812.

The wall 8112 has a round hole whose center is disposed on the center axis 41J. This round hole has an inside diameter so large that the engaging portion 422 of the second foot main body 42 can be inserted through the round hole, and smaller than the outside diameter of the projection end of the engaging portions 412.

The wall 8113 has a round hole whose center is located on the center axis 41J. This round hole has an inside diameter so large that the spiral portion 411 of the first foot main body 41 can be inserted through the round hole, and smaller than the outside diameter of the root end of the engaging portions 412. The pair of the engaging portions 412 of the first foot main body 41 are inserted through the round hole of the wall 8113 while deformed in such directions as to come close to each other, so that the upper parts of the root end of the engaging portions 412 can engage with the wall 8113. Moreover, the shift of the first foot main body 41 in the downward direction (−Z direction) is regulated by the wall 8112. According to this structure, the first foot main body 41 is supported by the holding unit 8 in such a manner as to be rotatable with respect to the holding unit 8, while the holding unit 8 shifts in accordance with the movement of the first foot main body 41 in the projection direction of the first foot main body 41 (Z direction).

Each of the pair of the extension portions 82 shaped symmetric with respect to the center axis 41J has a flat surface extending along the Y-Z plane. A projection 821 projecting in a direction away from the center axis 41J is provided on each distal end of the pair of the extension portions 82.

The pair of the extension portions 82 of the holding unit 8 are inserted into the guide holes 52 of the base 5 while bended in such directions as to come close to each other. As noted above, the holding unit 8 shifts in the Z direction together with the first foot main body 41 with the pair of the extension portions 82 guided by the guide holes 52.

As illustrated in FIG. 5A, the projections 821 of the holding unit 8 engage with the top surface 5T of the base 5 so as not to be separated from the base 5 when the holding unit 8 is projected to the maximum from the base 5.

Operation of Foot Unit

The operation of the foot unit 4 is now explained.

Figure 6A:
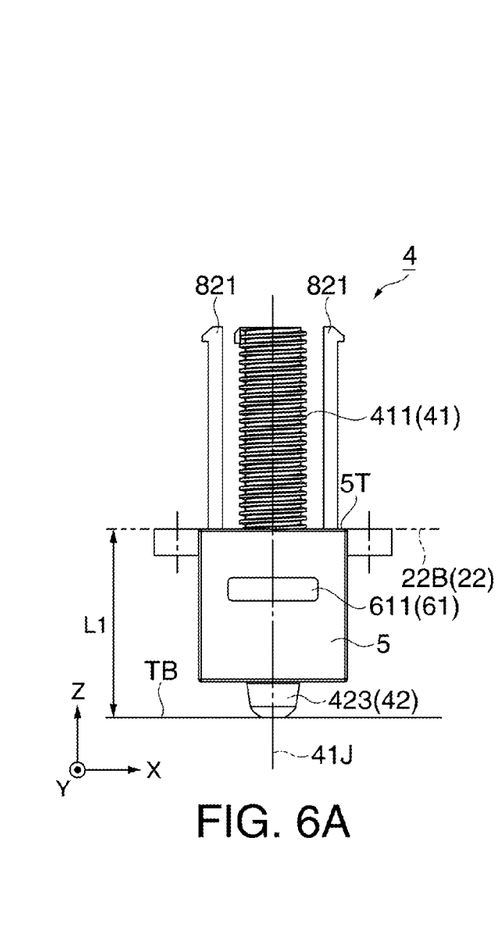
FIGS. 6A through 6C are front views of the foot unit as viewed from the front.
Figure 6B:
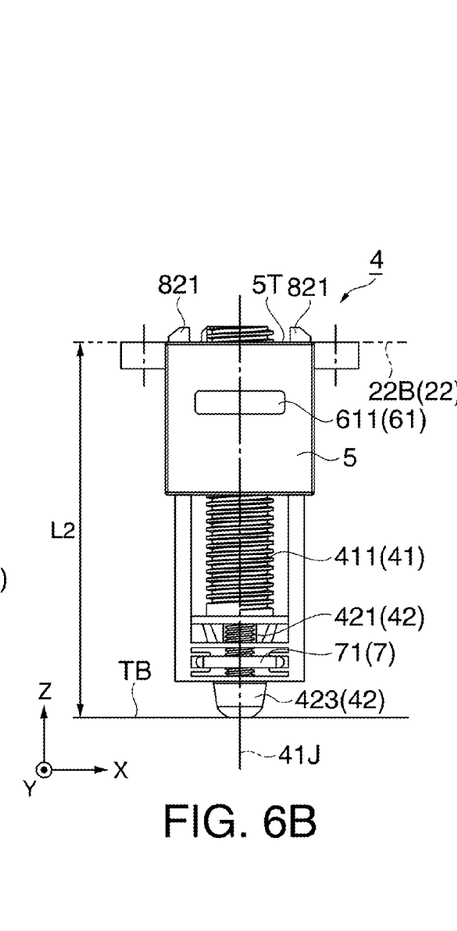
Figure 6C:
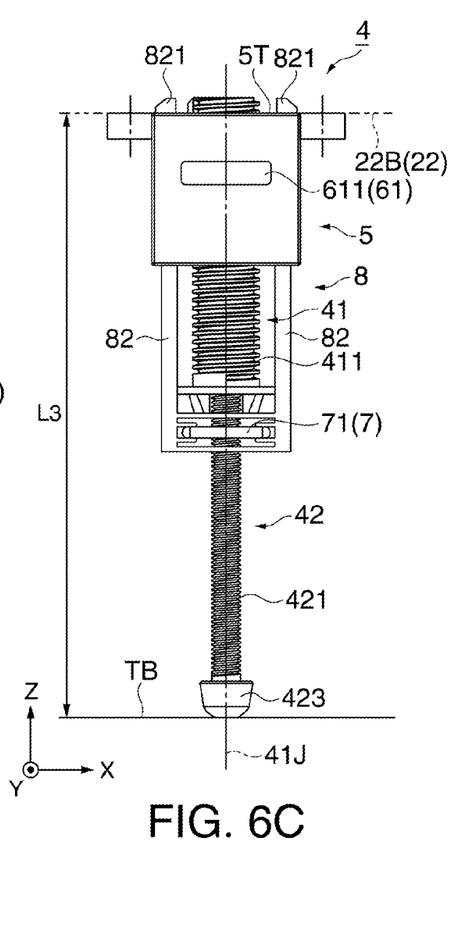

FIGS. 6A through 6C are front views of the foot unit 4 as viewed from the front. More specifically, FIG. 6A shows a minimum condition in which the projections of both the first foot main body 41 and the second foot main body 42 are the minimum. FIG. 6B shows an intermediate condition in which the first foot main body 41 is projected to the maximum, with the projection of the second foot main body 42 still kept the minimum. FIG. 6C shows a maximum condition in which both the first foot main body 41 and the second foot main body 42 are projected to the maximum.

As illustrated in FIG. 6A, the foot unit 4 under the minimum condition projects from the bottom surface 22B of the lower case 22 by a projection length L1 with the installation portion 423 exposed from the lower part of the base 5. In the minimum condition, the second adjusting unit 7 (see FIGS. 5A and 5B) concealed in the base 5, wherefore the second lever 71 (see FIGS. 5A and 5B) is not exposed to the outside.

For fine adjustment of the projection length of the second foot main body 42, the installation portion 423 in the minimum condition is rotated in one direction to shift the second foot main body 42 in such a direction that the projection length of the second foot main body 42 increases, or the installation portion 423 is rotated in the other direction to shift the second foot main body 42 in such a direction that the projection length of the second foot main body 42 decreases. As noted above, the projection length of the second foot main body 42 is variable until the engaging portion 422 comes into engagement with the step formed by the opening 413 and the hollow portion 414 of the first foot main body 41 (see FIG. 5B).

When the operation unit 611 is pressed toward the rear (−Y direction) under the minimum condition of the foot unit 4, the first engaging portion 613A (see FIG. 5B) of the first lever 61 is separated from the spiral portion 411 to switch the engagement condition between the first engaging portion 613A and the first foot main body 41 to a non-engagement condition for releasing this engagement. Under the non-engagement condition, the projection length of the first foot main body 41 can be changed by a large amount at a time. In this case, the projection length can be increased up to the position of engagement between the projection 821 and the top surface 5T of the base 5 as illustrated in FIG. 6B. Under the intermediate condition in this figure, the foot unit 4 projects from the bottom surface 22B of the lower case by a projection length L2.

When the press of the operation portion 611 is released, the first foot main body 41 is brought into the engagement condition where fine adjustment of the projection length of the first foot main body 41 can be performed in accordance with the direction of rotation of the first foot main body 41 similarly to the fine adjustment of the second foot main body 42. The holding unit 8 engaging with the first foot main body 41 shifts together with the first foot main body 41 without rotation at the time of rotation of the first foot main body 41. On the other hand, the second foot main body changes its projection length in accordance with the direction of rotation of the second foot main body 42 in the manner explained above regardless of the projection length of the first foot main body 41.

When the first foot main body 41, i.e., the holding unit 8 of the foot unit 4 under the minimum condition is shifted to a predetermined position, the second lever 71 is brought to exposure to the outside. When the second lever 71 of the foot unit 4 is pressed toward the rear (−Y direction), the second engaging portion 711A (see FIG. 4) of the second lever 71 is separated from the spiral portion 421 to switch the engagement condition between the second lever 71 and the second foot main body 42 to a non-engagement condition for releasing this engagement.

Under the non-engagement condition, the projection length of the second foot main body 42 can be changed by a large amount at a time. In this case, the projection length can be increased up to the position of engagement between the engaging portion 422 and the step formed by the opening 413 and the hollow portion 414 of the first foot main body 41 as explained above. Under the maximum condition shown in FIG. 6C, the foot unit 4 projects from the bottom surface 22B of the lower case 22 by a projection length L3.

Accordingly, two-step adjustment of the foot unit 4 can be achieved by the change of the projection lengths of the first foot main body 41 and the second foot main body 42.

According to the projector 1 in this embodiment, the following advantages can be offered.

According to this structure, the projection length of the first foot main body 41 from the external case 2 and the projection length of the second foot main body 42 from the first foot main body 41 can be adjusted. In this case, the projection length of the foot unit 4 from the external case 2 increases while the space of the external case 2 for storing the foot unit 4 in the projection direction decreases. Therefore, the projector 1 achieves both size reduction and large-scale change of its inclination angle with respect to the installation surface, that is, the height of the image to be projected in a wide range.

The second foot main body 42 is accommodated in the first foot main body 41. This structure achieves space saving of the external case 2 in directions crossing the projection direction of the foot unit 4, that is, in the X and Y directions, and thus contributes to further size reduction of the projector 1.

When the projection length of the first foot main body 41 is changed by rotation of the first foot main body 41, that is, when the first foot main body 41 shifts in the projection direction, the holding unit 8 moves in the projection direction in accordance with the shift of the first foot main body 41 without rotation. In this case, the second adjusting unit 7 held by the holding unit 8 does not rotate. Thus, the structure of the second adjusting unit 7 can be simplified. Moreover, the user of the projector 1 can easily observe the second lever 71 and adjust the projection length of the second foot main body 42.

The first foot main body 41 and the second foot main body 42 of the foot unit 4 have the spiral portion 411 and the spiral portion 421, respectively, and both switch between the engagement condition and the non-engagement condition. According to this structure, the user can perform fine adjusting of the projection length under the engagement condition, and also can change the projection length by a large amount at a time under the non-engagement condition. Thus, the image to be projected can be easily shifted to a desired position, wherefore the usability of the projector 1 improves.

The second adjusting unit 7 of the foot unit 4 is concealed in the base 5 under the minimum condition. In this case, the volume of uneven portions and the like exposed in the external appearance decreases. Accordingly, the design of the projector 1 improves.

Modified Example

This embodiment can be modified in the following manners.

According to this embodiment, both the first foot main body 41 and the second foot main body 42 of the foot unit switch between the engagement condition and the non-engagement condition. However, such a structure is allowed which switches the condition of only either the first foot main body 41 or the second foot main body 42 between the engagement condition and the non-engagement condition, and keeps the condition of the other of the foot main bodies 41 and 42 in the engagement condition without change.

Alternatively, both the first foot main body 41 and the second foot main body 42 may be kept only in the engagement condition. In this case, the coil springs 62 and 72 may be eliminated so as to keep the first lever 61 and the second lever 71 immovable.

According to this embodiment, the first foot main body 41 and the second foot main body 42 have the spiral portions 411 and 421, respectively, and change their projection lengths by rotation. However, the projection length of one or both of the first and second foot main bodies 41 and 42 may be varied by their sliding movements without rotation. For example, the first foot main body 41 may have a plurality of grooves extending in directions perpendicular to the projection direction of the foot unit 4 in place of the spiral portion 411. In this case, the first adjusting unit 6 is constructed in such a shape as to engage with and disengage from these grooves.

According to this embodiment, the projector 1 includes the transmission type liquid crystal light valves 351 as light modulation devises. However, the light modulation devices may be constituted by reflection type liquid crystal light valves.

The light source 311 is not limited to the discharge type lamp employed in this embodiment but may be any of other types of lamp or a solid light source such as a light emitting diode.

What is claimed is:

1. A projector comprising:
an optical unit configured to modulate light emitted from a light source and project the modulated light;
an external case which stores the optical unit; and
a foot unit configured to project from the external case, the foot unit includes:
  a first foot main body whose projection length from the external case is variable,
  a second foot main body whose projection length from the first foot main body in the same direction as the projection direction of the first foot main body is variable,
  a first adjusting unit configured to adjust the projection length of the first foot main body, and
  a second adjusting unit configured to adjust the projection length of the second foot main body.

2. The projector according to claim 1, wherein the second foot main body is constructed so as to be inserted into the first foot main body.

3. The projector according to claim 2, wherein
the first foot main body rotates to change the projection length of the first foot main body;
the foot unit further includes a holding unit configured to rotatably support the first foot main body and hold the second adjusting unit; and
the holding unit shifts with the first foot main body along the projection direction of the first foot main body.

4. The projector according to claim 1, wherein
at least either the first foot main body or the second foot main body includes a spiral portion which has an outer periphery formed with a spiral concave; and
at least either the first adjusting unit or the second adjusting unit includes an engaging portion whose condition switches between an engagement condition where the engaging portion engages with the spiral portion and a non-engagement condition where the engaging portion disengages from the spiral portion.

5. The projector according to claim 2, wherein
at least either the first foot main body or the second foot main body includes a spiral portion which has an outer periphery formed with a spiral concave; and
at least either the first adjusting unit or the second adjusting unit includes an engaging portion whose condition switches between an engagement condition where the engaging portion engages with the spiral portion and a non-engagement condition where the engaging portion disengages from the spiral portion.

6. The projector according to claim 3, wherein
at least either the first foot main body or the second foot main body includes a spiral portion which has an outer periphery formed with a spiral concave; and
at least either the first adjusting unit or the second adjusting unit includes an engaging portion whose condition switches between an engagement condition where the engaging portion engages with the spiral portion and a non-engagement condition where the engaging portion disengages from the spiral portion.

7. The projector according to claim 1, wherein
the foot unit has a base fixed to the external case; and
the second adjusting unit is concealed in the base when the projection of the foot unit is the minimum.

* * * * *